United States Patent
Barsotti et al.

(10) Patent No.: US 6,426,148 B1
(45) Date of Patent: Jul. 30, 2002

(54) OLIGOMERIC EPOXY/ISOCYANATE SYSTEMS

(75) Inventors: Robert John Barsotti, Franklinville, NJ (US); Lee R. Harper, Media, PA (US); John David Nordstrom, Huntington Woods, MI (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/462,968

(22) PCT Filed: Jul. 23, 1998

(86) PCT No.: PCT/US98/15230

§ 371 (c)(1),
(2), (4) Date: Jan. 14, 2000

(87) PCT Pub. No.: WO99/05193

PCT Pub. Date: Feb. 4, 1999

(51) Int. Cl.$^7$ .............................................. C09D 175/04
(52) U.S. Cl. ................ 428/423.1; 525/65; 525/111; 525/123; 525/131; 525/438; 525/440; 525/528; 528/73; 427/386
(58) Field of Search ................. 525/111, 123, 525/131, 438, 440, 528, 65; 528/73; 428/423.1; 427/386

(56) References Cited

U.S. PATENT DOCUMENTS

| | | | | |
|---|---|---|---|---|
| 4,169,825 A | * | 10/1979 | Yapp | 525/438 |
| 4,409,381 A | * | 10/1983 | Holubka | 528/45 |
| 4,749,743 A | * | 6/1988 | Ambrose | 525/123 |
| 5,086,152 A | * | 2/1992 | Iwamoto | 528/58 |
| 5,215,783 A | | 6/1993 | Harper | 427/160 |
| 5,286,782 A | | 2/1994 | Lamb et al. | 524/507 |
| 5,331,050 A | | 7/1994 | Harper | 525/125 |

FOREIGN PATENT DOCUMENTS

| | | | |
|---|---|---|---|
| WO | 96/01864 | * | 1/1996 |
| WO | 97/44402 | | 11/1997 |

* cited by examiner

*Primary Examiner*—Patricia A. Short
(74) *Attorney, Agent, or Firm*—Sudhir G. Deshmukh

(57) ABSTRACT

A curable coating composition comprising, in an organic solvent, a binder of (i) a non-isocyanate oligomer or blend of oligomers containing at least two functional groups with at least one being an epoxy group, the remaining being epoxy or hydroxyl; (ii) optionally a polyester, oligoester, or acrylic polymer with at least two hydroxyl groups; and (iii) an oligomeric crosslinker or blend of crosslinkers which contain at least two isocyanate groups.

15 Claims, No Drawings

OLIGOMERIC EPOXY/ISOCYANATE SYSTEMS

BACKGROUND OF THE INVENTION

This invention concerns coating systems comprising non-isocyanate and isocyanate components in organic solvents. The non-isocyanate components being an oligomer or blend of oligomers containing at least two functional groups, at least one being epoxy; optionally present is a polyester or oligo-ester or acrylic polymer having at least two hydroxyl groups.

U.S. Pat. No. 5,215,783 discloses a process for coating a substrate with a waterborne basecoat and a clearcoat containing a polymeric epoxy group.

SUMMARY OF THE INVENTION

It has now been discovered that oligomeric epoxies will react directly with isocyanates to form well-crosslinked coatings. This reaction occurs rapidly at elevated temperatures but relatively slowly at room temperature. This is in sharp contrast to polymeric acrylic epoxies which react poorly at any temperature. The room temperature reaction is enhanced significantly by the use of epoxy compounds which also include hydroxyl moieties. These epoxies can be used as diluents in traditional hydroxyl/ isocyanate coatings. This crosslinking system results in coatings with very low volatile organic content (VOC) that are durable and display good etch and mar resistance.

The invention specifically concerns a curable coating composition of a binder in organic solvent comprising A) a non-isocyanate component wherein:
   i) 5–100% by weight of the non-isocyanate component is an oligomer or blend of oligomers with a weight average molecular weight not exceeding about 3,000, a polydispersity not exceeding 1.7, containing at least two functional groups with at least one being an epoxy group, the remaining being epoxy or hydroxyl;
   ii) 0–95% by weight of the non-isocyanate component of a polyester, oligo-ester or acrylic polymer each having at least two hydroxyl groups; and B) an oligomeric isocyanate crosslinker containing at least two isocyanate groups; the equivalents of B to A being 0.5 to 3.0 of isocyanate to epoxy or epoxy plus hydroxyl.

Contemplated embodiments of the invention are those wherein component (ii) is absent and cure is accelerated by ambient moisture, and where component (ii) contains at least one hydroxyl group derived from acrylates and/or methacrylates, and at least one epoxy group derived from glycidyl methacrylate and/or glycidyl acrylate.

Also contemplated is the above composition cured at ambient conditions or baked at elevated temperatures. Such composition can include hydroxyl and/or epoxy-functional nonaqueous dispersions, and these optional crosslinkers: aldimines, ketimines, and polyaspartic esters. Catalysts such as tin and tertiary amines (alone or in combination with acetic acid) can be employed. The disclosed composition is useful in clearcoats and pigmented compositions to coat substrates, preferably vehicle bodies and vehicle body parts.

DETAILS OF THE INVENTION

The compositions of this invention show a remarkable combination of wet-properties and film-properties. The combination of oligomeric epoxies crosslinked by oligomeric isocyanates have shown 1) the potential for extremely low volatile organic content (VOC). VOC's below 2.0 lbs/gallon, (0.24 kg/liter) and in some cases (with only epoxy/isocyanate) approaching 1.0 (0.12 kg/liter) VOC, have been successfully sprayed with excellent appearance and cure;
2) the etch resistance of these coatings is superior to standard hydroxyl/isocyanate systems of similar film Tg (glass transition temperature). This results in coatings with a superior etch/mar balance which is critical to today's finishes;
3) the fracture properties of these systems, as measured by single indentor testing, is superior to standard hydroxyl/isocyanate systems; and
4) excellent durability exceeding 7000 hours of acccelerated QUV exposure (using an FS-40 bulb) has been seen with these coatings.

These epoxy or epoxy/hydroxyl-functional oligomers can be used to improve the spray solids or film properties of standard polymeric isocyanate crosslinked systems.

Binder Components

Representative binder components of these systems include epoxy functional oligomers, epoxy/hydroxyl-functional oligomers and isocyanate functional oligomers. Other functional oligomers and polymers can also be included in the formulations of this invention.

Component A(i)

The oligomeric component contains at least two functional groups and should have a molecular weight of less than about 3000. Typical epoxy components containing a hydroxy functionality or (OH) group include, among others, sorbitol polyglycidyl ether, mannitol polyglycidyl ether, pentaerythritol polyglycidyl ether, glycerol polyglycidyl ether, low molecular weight epoxy resins such as epoxy resins of epichlorohydrin and bisphenol-A, and polyglycidyl ethers of isocyanurates, for example, "Denecol" EX301 from Nagase and DCE-358® sorbitol polyglycidyl ether from Dixie Chemical. These types of oligomers are preferred for ambient cure, but are also useful for baked systems.

Epoxy components which typically do not contain significant hydroxy functionality include, among others, di- and polyglycidyl esters of polycarboxylic acids, and di- and polyglycidyl esters of acids, such as Araldite CY-184® from Ciba-Geigy, or XU-71950 from Dow Chemical are preferred since they form high quality finishes. Cycloaliphatic epoxies can also be used, such as ERL-4221 from Union Carbide. These oligomers are primarily used in baked systems, but can be used at low levels in ambient cured systems.

Component B

The composition also contains an organic isocyanate crosslinking agent in the amount of 0.5 to 3.0 equivalents of isocyanate per equivalent of epoxy or epoxy/hydroxyl. Optimum film properties are achieved when one epoxy group reacts with two isocyanate groups. However, it was determined that a broad latitude in stoichiometry of isocyanate to epoxy can sometimes be useful depending on final wet- and dry-coating properties desired. Any of the conventional aromatic, aliphatic, or cycloaliphatic isocyanates; trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis-cyclohexyl diisocyanate, tetramethylene xylene diisocyanate, ethyl ethylene diisocyanate, 2,3-dimethyl ethylene diisocyanate, 1-methyltrimethylene diisocyanate, 1,3-phenylene diisocyanate, 1,5-napthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like, Trimers of diisocyanates also can be used such as the trimer of hexamethylene diisocyanate which is sold under the tradename "Desmodur"® N-3390 and the trimer of isophorone diisocyanate. Trifunctional adducts of triols and diisocyanates can be used.

Optional Ingredients

The present coating composition can further comprise a functional amount of catalyst, generally about 0.1 to 5 weight percent, based on the weight of solids in the formulation. A wide variety of catalysts can be used, such as dibutyl tin dilaurate or tertiary amines such as triethylenediamine. These catalysts can be used alone or in conjunction with carboxylic acids such as acetic acid. It is preferred that a catalyst be employed.

The coating compositions of the present invention are formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate. It is preferred to employ solvent.

The coating compositions of the present invention can also contain up to 40% of total binder of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 microns. The arms, attached to the core, make up about 10 to 90%, preferably 10 to 59%, by weight of the dispersed polymer, and have a weight average molecular weight of about 1,000 to 30,000, preferably 1,000 to 10,000.

The macromolecular core of the dispersed polymer is comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates.

The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

Additional crosslinkers can be included in this formula such as aldemine, including the reaction product of isobutyraldehyde with diamines such as isophorone diamine and the like; ketimines such as the reaction product of methyl isobutyl ketone with diamines such as isophorone diamine; and polyaspartic esters.

The coating compositions of the present invention can also contain conventional additives such as pigments, stabilizers, ultraviolet light stabilizers, antioxidants, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

Component A(ii):

The coating compositions of the present invention can also an acrylic polymer of weight average molecular weight greater than 3,000, or a conventional polyester such as SCD®-1040 from Etna Product Inc. for improved properties and appearance, sag resistance, flow and leveling and such. The acrylic polymer can be composed of typical monomers such as acrylates, methacrylates, styrene and the like and functional monomers such as hydroxy ethyl acrylate, glycidyl methacrylate, or the like.

Representative hydroxyl-functional oligomers that can be employed as component A(ii) include the reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like, said reaction product further extended by reaction with monofunctional epoxies such as butylene oxide, propylene oxide, and the like to form hydroxyl oligomers.

Non-alicyclic oligomers (linear or aromatic) can include succinic anhydride- or phthalic anhydride-derived moieites such as described above. Caprolactone oligomers which can be made by reacting caprolactone with a cycloaliphatic, aliphatic or aromatic polyol can also be used. Particulary useful caprolactone oligomers are described in columns 4 to 5 of U.S. Pat. No. 5,286,782.

Preferred oligomers A(ii) have weight average molecular weights not exceeding about 3,000 with a polydispersity not exceeding about 1.7; more referred oligomers have molecular weights not exceeding about 2,500 and polydispersity not exceeding about 1.4; most preferred oligomers have molecular weights not exceeding about 2,200, and polydisperity not exceeding about 1.25.

The coating compositions are typically applied to a substrate by conventional techniques such as spraying, electrostatic spraying, roller coating, dipping or brushing. The present formulations are particularly useful as a clear coating for outdoor articles, such as automobile and other vehicle body parts. The substrate is generally prepared with a primer and/or a color coat or other surface preparation prior to coating with the present compositions.

After application to a substrate, the present compositions can be cured by heating to a temperature of about 120° to 150° C. for a period of about 15 to 90 minutes or with the proper formulation can be cured at ambient conditions (about 60° to 110° F., depending on the geographical location, usually 65° to 90° F.).

The performance characteristics of the final cured coating composition are excellent, providing a combination of excellent gloss and durability to abrasion, sunlight and acidic rain. At the same time, the compositions provide low volatile organic content and ease of handling. The ability to apply the present compositions by spraying techniques with the unusually low VOC content is surprising.

The present invention is further illustrated by the following specific examples, in which parts and percentages are by weight unless otherwise indicated.

EXAMPLES

KEY FOR EXAMPLES

| Tradename or identifier | Chemical Description |
|---|---|
| Tinuvin ® 384 (UVA) | substituted benzotriazole (Ciba-Geigy) |
| Tinuvin ® 292 (HALS) | hindered amine derivative (Ciba-Geigy) |
| BYK ® 306 | silane flow additive (BYK-Chemie) |
| Tolonate ® HDT or HDT-LV | isocyanurate oligomers of hexamethylene diisocyanate (Rhone-Poulenc) |

Procedure 1
TETRAHYDROXY-FUNCTIONAL OLIGOMER
Preparation of Acid Oligomer

To a 12-liter flask fitted with an agitator, condenser, heating mantle, nitrogen inlet, thermocouple and an addition port was added 2447.2 gms of propylene glycol monomethylether acetate, 792.4 gms of pentaerythritol and 1.36 gms of triethylamine. The reaction mixture was agitated and heated to 140° C. under a nitrogen blanket at which time 3759 gms of methyl hexahydrophthalic anhydride was added over 6 hrs. The reaction mixture was then held at 140° C. until no anhydride bands were observed on an infrared spectroscopic trace.

Preparation of Hydroxy Oligomer

To a 5-liter flask fitted with an agitator, condenser, heating mantle, nitrogen inlet, thermocouple and an addition port was added 2798.4 gms of acid oligomer prepared above and 2.76 gms of triethylamine. The mixture was agitated and heated to 60° C. under nitrogen. Then, 696.9 gms of 1,2-epoxy butane was added over 120 mins, after which the temperature was raised to 105° C. and held at that temperature until the acid number dropped to about 10 or less. Percent weight solids were 71.5, Gardner viscosity V, number average molecular weight 895 and weight average molecular weight 1022 as determined by GPC (polystyrene standard).

Procedure 2

The hydroxy-functional acrylic component was made as follows:

a stirred, heated reactor is charged with
  I Methyl amyl ketone 148.05 parts
    This mixture was heated to reflux (about 150–155° C.)
    The following feed was then added simultaneously with part In uniformly over 5 hours while maintaining reflux:
  II Isobutyl methacrylate monomer 182.56
    2-ethylhexyl methacrylate monomer 237.37
    2-hydroxyethyl methacrylate 129.16
    The following feed was fed simultaneously with part II over 150 minutes. When addition is complete cool reactor to 130° C.
  III Methyl amyl ketone 58.64
    t-butyl peroxyacetate 70% soln 26.51
    After the previous feed the following was added over 30 minutes while maintaining reflux (hold temperature at 130° C. Cool and fill sample
  IV Methyl amyl ketone 14.81
    t-butyl peroxyacetate initiator 6.55

The batch was then cooled and filled out.

Total ~804.00
Solids- 68.0%
Viscosity=W to Y Gardner-Holdt
Gallon Weight=8.04

Example 1

Two-Component Oligomeric Epoxy/Isocyanate clear—bake system

Component (i)

| | |
|---|---|
| Diglycidyl ester of 1,2 cyclohexane dicarboxylic acid | 189.78 |
| Tinuvin ® (UV Screener from Ciba-Geigy) | 11.01 |
| Tinuvin ® (Hindered Amine Light Stabilizer from Ciba-Geigy) | 8.26 |
| 10% BYK-301 ® (flow additive from BYK Chemie) in Propylene Glycol Monomethyl ether acetate | 2.76 |
| 10% DiButyl Tin Dilaurate (DBTDL) in Butyl Acetate | 1.38 |
| Butyl Acetate | 50 |
| Component B | |
| Tolonate HDT-LV ® (Isocyanurate trimer of hexamethylene diisocyanate from Rhone-Poulenc) | 361.06 |

Components (i) and (B) are mixed, the clear is then thinned to a Zahn #2 viscosity of 30 seconds with butyl acetate. The clear is spray-applied over a black solvent-borne basecoat which has already been baked for 30 minutes at 130° C. (265° F.). The coating is cured for 30 minutes at 141° C. (285° F.). This coating exhibits excellent cure, hardness, and appearance.

Example 2

Oligomeric Epoxy/Oligomeric Hydroxyl/Isocyanate clear—bake system

| Components (i) and (ii) | |
|---|---|
| Diglycidyl ester of 1,2 cyclohexane dicarboxylic acid | 102.6 |
| Tetra Hydroxyl functional oligomer (from Procedure #1) | 141.71 |
| Tinuvin ® 384 (UV Screener from Ciba-Geigy) | 10.82 |
| Tinuvin ® 292 (Hindered Amine Light Stabilizer from Ciba-Geigy) | 8.12 |
| 10% BYK-301 ® (flow additive from BYK Chemie) in Propylene Glycol Monomethyl ether acetate | 2.16 |
| 10% DiButyl Tin Dilaurate in Butyl Acetate | 1.35 |
| Butyl Acetate | 67 |

Component (B)

Tolonate HDT-LV® (Isocyanurate trimer of
  hexamethylene diisocyanate from Rhone-Poulenc) 335.92

The components are mixed, the clear is then thinned to a Zahn #2 viscosity of 30 seconds with butyl acetate. The clear is spray-applied over a black water-borne basecoat which has already received a warm air flash of 5 minutes at 82° C. (180° F.). The coating is cured for 30 minutes at 141° C. (285° F.). This coating exhibits excellent cure, hardness, and appearance.

Example 3

Oligomeric Epoxy/Aldimine/Isocyanate clear—bake system

| Component (i) | |
|---|---|
| ERL 4299 (cycloaliphatic epoxy from Union Carbide) | 101.5 |
| Desmophen ® XP-7069 (Aldimine from Bayer) | 101.5 |
| Tinuvin ® 384 (UV Screener from Ciba-Geigy) | 0.64 |
| Tinuvin ® 292 (Hindered Amine Light Stabilizer from Ciba-Geigy) | 7.98 |
| 10% BYK-301 ® (flow additive from BYK Chemie) in Propylene Glycol Monomethyl ether acetate | 2.13 |
| 10% Octanoic acid in Propylene Glycol Monomethylester acetate | 3.73 |
| Butyl Acetate | 92 |
| Component (B) | |
| Tolonate HDT ® (Isocyanurate trimer of hexamethylene diisocyanate from Rhone-Poulenc) | 340.04 |

Components (i) and (B) are mixed, the clear is then thinned to a Zahn #2 viscosity of 30 seconds with butyl acetate. The clear is spray-applied over a black water-borne basecoat which has already received a warm air flash of 5 minutes at 85° C. (180° F.). The coating is cured for 30 minutes at 141° C. (285° F.). This coating exhibits excellent cure, hardness, and appearance.

Example 4

Oligomeric Epoxy/Hydroxyl with Isocyanate Clearcoat—bake/ambient system

| Component (i) | |
|---|---|
| DC E 358 ® Sorbitol ether epoxy/hydroxyl compound from Dixie Chemical | 12.86 |
| 10% BYK-301 ® (flow additive from BYK Chemie) in Propylene Glycol Monomethyl ether acetate | 0.49 |
| 1% DiButyl Tin Dilaurate in Methyl Ethyl Ketone | 2.45 |
| Butyl Acetate | 18.06 |
| Component (B) | |
| Tolonate HDT ® (Isocyanurate trimer of hexamethylene diisocyanate from Rhone-Poulenc) | 36.14 |

Components (i) and (B) are mixed. The clear is drawn down over primed steel panels and TEDLAR® to a thickness of about 2 mils. The coating is cured for 30 minutes at 141° C. (285° F.). This coating exhibits excellent cure, hardness, mar resistance, and appearance. The percent gel fraction as measured by boiling the free film of this coating in acetone for 6 hours is 97.7%, which is excellent.

This same coating was cured at ambient conditions and found to give good hardness, appearance and cure. The gel fraction on the air dried system after 30 days of room temperature aging was 94.7%. The "surface dry time" as measured by a BK dry time tester was 260 minutes.

Example 5

Oligomeric Epoxy/Isocyanate clearcoat—bake system

| Component (i) | |
|---|---|
| ERL-4221 ® (cycloaliphatic epoxy from Union Carbide) | 13.14 |
| 10% BYK-301 ® (flow additive from BYK Chemie) in Propylene Glycol Monomethyl ether acetate | 0.49 |
| 1% DiButyl Tin Dilaurate in Methyl Ethyl Ketone | 2.45 |
| Butyl Acetate | 18.06 |
| Component B | |
| Tolonate HDT ® (Isocyanurate trimer of hexamethylene diisocyanate from Rhone-Poulenc) | 35.86 |

Components (i) and (B) are mixed. The clear is drawn down over primed steel panels and TEDLAR® to a thickness of about 2 mils. The coating is red for 30 minutes at 141° C. (285° F.). This coating exhibits excellent cure, hardness, and appearance. The gel fraction as measured by boiling the free film of this coating in acetone for 6 hours is 96.2%.

| Ingredient | Weight (6) | Weight (7) |
|---|---|---|
| IBMA/EHMA/HEMA Resin (Procedure 2) | 96.93 | 114.98 |
| XUGY-358[1] | 6.58 | 6.95 |
| MEK | 43.46 | 26.38 |
| Tinuvin ™ 1130 UV screener | 3.31 | 3.39 |
| Tinuvin ™ 123 hindered amine light stabilizer | 2.21 | 2.26 |
| BYK ™ 306 flow additive (silane) | 1.60 | 1.60 |
| 10% DBTDL in MEK | 0.44 | 0.45 |
| acetic acid | 1.00 | 1.00 |
| Tolonate HDT ™ | 32.16 | 30.79 |
| xylene | 12.32 | 12.19 |
| viscosity-initial (Zahn #2 cup) | 19 sec | 28 sec |
| viscosity-4 hours | 32 sec (#2 Zahn) | 41 sec (#3 Zahn) |
| BK dry time #2[2] | 1.00 hour | 0.875 hour |
| BK dry time #3[2] | 1.25 hours | 1.50 hours |
| VOC | 0.42 kg/liter | 0.43 kg/liter |
| Tukon hardness (Knoop) | 2.95 | 7.70 |

[1]Sorbitol Ether Epoxy-hydroxyl from Dixie Chemical
[2 and 3]Surface dry time using BK dry time tester

What is claimed:

1. A curable coating composition of a binder in organic solvent consisting essentially of:
  A) a non-isocyanate component wherein:
    i) 5–100% by weight of the non-isocyanate component is an oligomer or blend of oligomers with a weight average molecular weight not exceeding about 3,000, a polydispersity not exceeding 1.7, containing at least two epoxy functional groups but no significant hydroxy functionality;
    ii) 0–95% by weight of the non-isocyanate component of a polyester, oligo-ester or acrylic polymer each having at least two hydroxyl groups;
  B) an oligomeric isocyanate crosslinker containing at least two isocyanate groups; the equivalents of B to A being 0.5 to 3.0 of isocyanate to epoxy or epoxy plus hydroxyl; and
  C) a catalyst consisting essentially of dibutyl tin dilaurate or tertiary amine.

2. A composition according to claim 1 wherein said non-isocyanate component consists essentially of (i).

3. A composition of claim 1 wherein the functionality of component (i) further comprises hydroxyl.

4. A composition according to claim 1 wherein component (i) contains at least one hydroxyl group derived from a member selected from the group of hydroxyl acrylates and hydroxyl methacrylates and at least one epoxy group derived from a member selected from glycidyl acrylate and glycidyl methacrylate.

5. A composition of claim 1 wherein component (ii) is an acrylic polymer having a weight average molecular weight of at least 3000 and at least two hydroxyl groups selected from a member of the group hydroxyl acrylate and hydroxyl methacrylate.

6. A composition of claim 1 wherein component (ii) is a hydroxyl-functional polyester with a weight average molecular weight of at least 1500.

7. A composition of claim 1 wherein component (ii) is selected from a linear or branched cycloaliphatic moiety-containing oligomer or blend of oligomers with a weight average molecular weight not exceeding about 3,000, a polydispersity not exceeding about 1.7, and hydroxyl functionality.

8. A composition of claim 1 wherein component (ii) is a non-alicyclic oligomer with a weight average molecular weight not exceeding about 3,000, a polydispersity not exceeding about 1.7, and hydroxyl functionality.

9. A composition according to claim 1 which contains up to 40 percent by weight of total binder of an acrylic component comprising a core of acrylic polymer and, grafted thereto, a plurality of substantially linear stabilizer components, this component containing at least about 2 percent of ethylenically unsaturated monomer with functionality capable of reacting with B, the core being substantially insoluble and the stabilizer components being soluble in the solvent medium.

10. A composition according to claim 1 consisting essentially of one or more additional crosslinkers selected from the group consisting of aldimine, ketimine and polyaspartic ester.

11. An ambient temperature-cured coating of the composition of claim 1.

12. A bake-cured coating of the composition of claim 1.

13. A composition according to claim 1 additionally containing up to 200 parts by weight of pigment, based on 100 parts of binder.

14. A method for coating a substrate comprising applying thereto a composition according to claim 1 and curing the composition.

15. A substrate coated with the composition of claim 1.

* * * * *